United States Patent
Burk et al.

(10) Patent No.: US 10,569,973 B2
(45) Date of Patent: Feb. 25, 2020

(54) MOVING DEVICE HAVING AN OPERATING CONFIGURATION AND A MAINTENANCE CONFIGURATION

(71) Applicant: WEBER MASCHINENBAU GmbH BREIDENBACH, Breidenbach (DE)

(72) Inventors: Alexander Burk, Dautphetal (DE); Christoph Eckhardt, Breidenbach (DE); Jochen Gerlach, Dautphetal (DE); Marco Nichau, Bad Laasphe (DE); Thomas Nispel, Dautphetal (DE); Ingo Rother, Breidenbach (DE); Leopold Von Keudell, Salem (DE); Steffen Zecher, Staufenberg (DE)

(73) Assignee: Weber Maschinenbau GmbH Breidenbach (DE)

( * ) Notice: Subject to any disclaimer, the term of this patent is extended or adjusted under 35 U.S.C. 154(b) by 0 days.

(21) Appl. No.: 15/538,462

(22) PCT Filed: Dec. 17, 2015

(86) PCT No.: PCT/EP2015/080294
§ 371 (c)(1),
(2) Date: Jun. 21, 2017

(87) PCT Pub. No.: WO2016/102317
PCT Pub. Date: Jun. 30, 2016

(65) Prior Publication Data
US 2017/0349386 A1    Dec. 7, 2017

(30) Foreign Application Priority Data

Dec. 22, 2014  (DE) .................. 10 2014 119 352

(51) Int. Cl.
*B65G 54/02*    (2006.01)
*B65G 45/22*    (2006.01)

(52) U.S. Cl.
CPC ............. *B65G 54/02* (2013.01); *B65G 45/22* (2013.01)

(58) Field of Classification Search
CPC .......... B65G 54/02; B65G 23/23; B60L 13/03
(Continued)

(56) References Cited

U.S. PATENT DOCUMENTS 1,333,877 A    3/1920  Ryczek
2,038,471 A *  4/1936  Benatar .................. B65G 21/08
                                                            198/860.5

(Continued)

FOREIGN PATENT DOCUMENTS

DE          627334 C    3/1936
DE          664323 C    8/1938
(Continued)

OTHER PUBLICATIONS

International Preliminary Report on Patentability for International Application No. PCT/EP2015/080294; dated: Dec. 17, 2015; 10 pages.
(Continued)

*Primary Examiner* — Joseph A Dillon, Jr.

(57) ABSTRACT

The invention relates to a device for moving objects (11), in particular food products, comprising a plurality of individually movable transport movers (12) for transporting the objects, a track system for the transport movers, in which the transport movers can be moved along at least one specified track (10), and a control apparatus for controlling the motions of the transport movers in the track system, wherein the track comprises a stator (14) and an associated guide (16) for the transport movers, and wherein the track can be converted from an operating configuration into a maintenance configuration at least in some segments, in which maintenance configuration at least one component of the
(Continued)

track can be moved out of the working position thereof corresponding to a transport operation in relation to the stator.

12 Claims, 8 Drawing Sheets

(58) Field of Classification Search
USPC .......................... 198/619, 805, 860.3, 860.5
See application file for complete search history.

(56) References Cited

U.S. PATENT DOCUMENTS

| | | | | |
|---|---|---|---|---|
| 2,837,203 A * | 6/1958 | Reeser | ................... | B65G 19/28 16/375 |
| 3,292,773 A * | 12/1966 | Keehart | ................ | B65G 21/02 198/823 |
| 3,706,922 A * | 12/1972 | Inagaki | ................... | B60L 13/03 310/12.18 |
| 3,850,691 A | 11/1974 | Bleil et al. | | |
| 3,856,135 A * | 12/1974 | Hayakawa | ............. | B65G 21/08 198/860.5 |
| 3,878,936 A * | 4/1975 | Niggemyer | ............ | B65G 21/08 198/860.2 |
| 4,090,604 A * | 5/1978 | Reifert | ................... | B65D 90/54 198/860.5 |
| 4,093,066 A * | 6/1978 | Mitchell | ................ | B65G 21/08 181/200 |
| 4,204,595 A * | 5/1980 | Marrs | ................ | B65G 21/2081 198/836.1 |
| 4,230,045 A | 10/1980 | Fearon | | |
| 4,714,151 A * | 12/1987 | Campbell | .............. | B65G 21/08 198/860.1 |
| 5,129,508 A * | 7/1992 | Shelstad | ............ | B65G 21/2081 198/836.1 |
| 5,251,741 A * | 10/1993 | Morishita | .............. | B65G 54/02 198/619 |
| 5,947,266 A * | 9/1999 | Rionde | ................ | B65G 21/08 198/860.3 |
| 6,011,508 A * | 1/2000 | Perreault | ................ | B61L 3/225 246/122 R |
| 6,101,952 A * | 8/2000 | Thornton | .............. | B60L 13/003 104/130.02 |
| 6,155,381 A * | 12/2000 | White | ..................... | A47F 9/047 186/68 |
| 6,499,701 B1 * | 12/2002 | Thornton | ................ | B60L 5/005 246/1 C |
| 6,578,495 B1 * | 6/2003 | Yitts | ....................... | B60L 13/00 104/292 |
| 6,634,490 B2 * | 10/2003 | Fischer | ............. | B65G 21/2054 198/820 |
| 6,781,524 B1 * | 8/2004 | Clark | .................... | B61L 25/025 180/168 |
| 6,917,136 B2 * | 7/2005 | Thornton | ................ | H02K 1/08 310/180 |
| 6,983,701 B2 * | 1/2006 | Thornton | ................ | B60L 13/06 104/282 |
| 7,448,327 B2 * | 11/2008 | Thornton | ................ | B60L 13/06 104/282 |
| 7,458,454 B2 * | 12/2008 | Mendenhall | ........... | B65G 35/06 198/377.02 |
| 7,538,469 B2 * | 5/2009 | Thornton | ................ | H02K 1/08 310/12.18 |
| 7,743,914 B2 * | 6/2010 | Nagahama | ........... | B65G 69/181 198/818 |
| 8,136,453 B2 * | 3/2012 | Hunter | ..................... | A63G 3/02 104/60 |
| 8,616,134 B2 * | 12/2013 | King | ..................... | B60L 13/003 104/284 |
| 8,662,292 B2 * | 3/2014 | Brackemyer | ........ | B65G 41/006 198/494 |
| 8,844,315 B2 * | 9/2014 | Bilger | ....................... | F25D 3/11 62/374 |
| 10,227,182 B2 * | 3/2019 | Burk | ........................ | B26D 7/32 |
| 10,308,437 B2 * | 6/2019 | Clossner | ................ | B65G 17/48 |
| 2005/0178643 A1 * | 8/2005 | Simoens | ................ | B65G 15/62 198/823 |
| 2006/0254887 A1 * | 11/2006 | Aubry | .................... | B65G 15/62 198/860.3 |
| 2008/0006172 A1 * | 1/2008 | Thornton | ................ | B60L 13/03 104/292 |
| 2009/0321224 A1 * | 12/2009 | Johanssen | .............. | B65G 21/08 198/860.3 |
| 2014/0231229 A1 * | 8/2014 | Aliesch | ................... | B65G 41/00 198/860.3 |
| 2017/0050332 A1 * | 2/2017 | Bauer | ...................... | B26D 7/32 |
| 2017/0334662 A1 * | 11/2017 | Burk | ........................ | B26D 7/32 |
| 2018/0086564 A1 * | 3/2018 | Clossner | ................ | B65G 17/48 |
| 2018/0214781 A1 * | 8/2018 | Hunter | ..................... | A63G 3/02 |
| 2018/0248460 A1 * | 8/2018 | Borghi | ................. | H02K 41/033 |
| 2018/0265230 A1 * | 9/2018 | Burk | .................. | A22C 17/0093 |

FOREIGN PATENT DOCUMENTS

| | | |
|---|---|---|
| DE | 2645046 A1 | 4/1978 |
| DE | 3415383 A1 | 11/1985 |
| DE | 212006000033 U1 | 12/2007 |
| DE | 102008018078 C5 | 10/2009 |
| EP | 1130191 A2 | 9/2001 |
| EP | 2392524 A1 | 12/2011 |
| EP | 2779432 A1 | 9/2014 |
| GB | 276445 A | 9/1927 |
| JP | S606523 A | 1/1985 |
| JP | S6115559 A | 1/1986 |
| WO | 03029651 A2 | 4/2003 |
| WO | 2007068897 A1 | 6/2007 |
| WO | 2010085670 A1 | 7/2010 |
| WO | 2013034534 A1 | 3/2013 |

OTHER PUBLICATIONS

Official Communication from the German Patent Office for German Application No. DE102014119352,0; dated: Sep. 17, 2015; 2 pages.

* cited by examiner

MOVING DEVICE HAVING AN OPERATING CONFIGURATION AND A MAINTENANCE CONFIGURATION

CROSS-REFERENCES TO THE RELATED APPLICATIONS

This patent application is a 371 of International Application No. PCT/EP2015/080294, filed Dec. 17, 2015 which claims the priority of German Application No. 102014119352.0, filed Dec. 22, 2014, each of which are incorporated herein by reference in their entirety.

The present invention relates to an apparatus for moving objects.

The objects can in particular be food products, for example portions that comprise one or more slices that were cut off from a food product, e.g. sausage or cheese, by means of a slicing apparatus, e.g. a high-speed slicer. The invention is, however, not restricted to this sector.

The movement apparatus comprises a plurality of movable transport movers for the transport of the objects. The movement apparatus furthermore comprises a path system for the transport movers, in which the transport movers are movable along at least one predefined path in a transport direction, and a control device for controlling the movements of the transport movers in the path system. The path comprises a stator and an associated guide for the transport movers. The drive for the transport movers can, for example, be formed as a linear motor, in particular as a linear synchronous motor or as a linear induction motor.

Such linear motors are generally known in connection with a plurality of applications. Such a drive principle is inter alia of advantage when comparatively small loads are to be transported.

A transport system which underlies the invention and to which reference will explicitly be made with respect to the requirement of performability of the invention is offered by the company MagneMotion, Inc., domiciled in Devens, Mass., USA. This system is based on a so-called LSM drive, that is on a drive by linear synchronous motors which is to be distinguished from a so-called linear induction motor (LIM drive). Unlike an LIM drive, in an LSM drive, a magnetic field is not induced by means of the so-called electromagnetic traveling field, but the magnetic field is provided by permanent magnets. When the rotor of the linear motor carries the permanent magnets and the stator of the linear motor generates the electromagnetic traveling field, the drive principle of an LSM drive can be figuratively imagined such that the transport mover provided with the permanent magnets is pulled over the transport line by the magnetic field moving along the stator. Such a transport system or drive principle is described, for example, in WO 2003/029651 A2 and WO 2010/085670 A1. Reference is herewith explicitly made to these documents with reference to the disclosure of a possible drive principle or function principle for the invention.

The path system or the individual paths of such a transport system can be divided into a plurality of consecutive path elements which so-to-say each form a single linear motor and can be individually controlled by a control device. If the transport movers located in the path system can be identified simultaneously by means of the control device, generally any desired number of transport movers can then be operated simultaneously in this manner in a path system of generally any desired complexity and can be individually moved in this respect.

The above-mentioned company MagneMotion, Inc. uses a technique for the identification and localization of the individual transporters in the path system in which each transporter mover is provided with a transducer which induces a signal in the stator formed by the path system, whereby it makes it possible for the control device to determine the exact position of the transporter with an accuracy dependent on the size of the total system of fractions of a millimeter or fractions of a centimeter. An advantage of this system comprises no external sensors being required. In the control system of the company MagneMotion, Inc., it is additionally ensured by a division of the paths into a plurality of path elements—which so-to-say each represent a single linear motor—that no collisions occur between consecutive transporter movers. A transport mover can thus only travel into the next path element when it is permitted by the control device, which is in particular not the case when another transport mover is located in the path element.

Against the background of this generally known transport system, provision is made in a possible embodiment in the invention that the path system is configured as a stator of the linear motor.

A disadvantage of the above-described transport system is that the transport movers are guided by at least one guide that is connected to the non-movable part of the transport system, called a stator in the following, with a simple dismantling of the guide not being provided and also not being necessary in the conventional previously customary applications of this transport system. It is therefore necessary for the servicing of the path in conventional path systems that the path has to be dismantled in a complex manner with a high time and labor effort. Long down times of the transport system hereby result, which in turn has the consequence of high costs. In addition, correspondingly trained staff are required who are in particular able, for example on the repeat installation taking place after a service, to observe the required tolerances so that the path system again works without problem.

Conventional path system are exposed to contaminants without protection. Cutting residues or cutting waste can thus reach the path, for example, in the food sector. In other applications, paper residues, wood chips, metal parts such as screw parts or plastic residues can reach the path, for example. The path in particular has a guide for the transport movers that can comprise one or more rails. A guide can in particular comprise a pair of parallel rails. If the contamination is in particular too large in the region of the rails, the transport movers can no longer move freely on the path.

It is therefore an object of the invention to improve a movement apparatus for objects such that contaminants can be easily removed from at least a part region of the path and a cleaning can take place that is thorough under hygienic aspects.

In accordance with the invention, the path can be transitioned at least sectionally from an operating configuration into a service configuration at least in a part region that is in particular at risk of contamination. In the service configuration, at least one component of the path is moved relative to the stator out of its working position corresponding to a transport operation. The component of the track can, in particular in the servicing position, be moved out of its working position such that the path is better accessible for servicing work, in particular for cleaning work.

Further developments of the invention can also be seen from the dependent claims, the description and the enclosed drawings.

In accordance with a preferred embodiment, the component is the guide or at least a part of the guide.

In accordance with a further embodiment, the component is in particular connected to the stator both in its working position corresponding to the operating configuration of the path and in a servicing position corresponding to the service configuration of the path and is adjustable between the working position and the servicing position, in particular by an adjustment movement that comprises at least a pure pivoting movement or linear movement and/or that comprises a combined release and adjustment movement.

In accordance with a further embodiment, a positioning aid is provided which in particular comprises shape-matching means and by which a desired position of the component is predefined, and is in particular secured, in the working position. A change of the component between the working position and the servicing position is hereby possible particularly easily.

Provision is made in accordance with a further embodiment that the component is fixed in the working position without additional connection means, in particular at a mount at the path associated with it.

Provision can alternatively or additionally be made that a fixing of the component effective in the working position can be released without tools.

In accordance with a further embodiment, a fixing of the component in the working position takes place by magnetic forces, by a latch connection, a plug-in connection, a clamping connection or a snap-in connection or by an articulated connection, wherein the fixing of the component is in particular at least also effected by its own weight.

In accordance with a further embodiment, the path is configured such that the path is subdivided in at least one part region into a plurality of path sections that are releasably connected to one another, wherein the guides of directly consecutive path sections are each connected to one another by at least one bridge, and wherein the bridges are each releasable without tools.

It is preferred if the guides in a contiguous part region of the path that represents a curve, for example, can be moved out of the working position simultaneously. A contiguous part region can, for example, also comprise adjacent guides oriented in the path direction and/or parallel guides at oppositely disposed side of the path or of the respective path section.

Provision can furthermore be made that a common mechanism is provided for the release of the bridges, on the one hand, and for the moving of the component out of the working position, on the other hand.

In accordance with a further embodiment, the path is subdivided in at least one part region into a plurality of path sections that are releasably connected to one another and that each have at least one stator and one guide, wherein the guides of at least some path sections can be moved out of the working position together.

In accordance with a further embodiment, the path is subdivided in at least one part region into a plurality of path sections that are releasably connected to one another and that each have at least one stator and one guide, wherein the guides of at least some path sections can be moved out of the working position independently of one another. It is hereby possible in principle to service some path sections while other path sections continue to be operated.

Provision can be made in accordance with a further embodiment that a or the control device is configured for a condition monitoring of at least one path section, wherein the control device is able to distinguish between the operating configuration and the service configuration as well as to initiate predefined measures in dependence on the respective detected condition.

A measure can e.g. comprise establishing a blockage of any desired type upstream and/or downstream of the respective path section for the transport movers after the transition of a path section into the service configuration, e.g. after the pivoting away of a guide, to prevent a moving of the transport movers into the path section just to be serviced. The blockage can be of a purely technical control manner. It is alternatively or additionally also possible to bring blockage means, e.g. in the form of an interference contour of any desired type, into the path of the transporters movers manually by a user, by which interference contour said transport movers can be made to stop in that e.g. the establishing of the interference contour results in a corresponding report in the control device that thereupon blocks the path section to be serviced in a technical control manner. This blocking therefore does not take place in a technical programming manner directly at the control device, but rather indirectly by establishing a detectable interference. Alternatively, the transition into the service configuration can also e.g. itself provide for a corresponding blocking report to the control device. It can thus in particular be prevented that transport movers fall onto the ground during a servicing.

Provision is made in accordance with an independent aspect of the invention that the disclosed embodiments can be combined with all of the other aspects of the invention disclosed herein that the path comprises a plurality of path sections, wherein the stators of the path sections overlap one another in the transition region in at least two directly consecutive path sections; and/or wherein guides disposed on the same side of the stators of the path sections overlap one another in the transition region.

The benefits of these embodiments in particular become clear against the background of a preferred general design of the path system known per se, according to which the respective path comprises path segments or path sections, wherein the segmentation or the pattern of the path is inter alia determined by the length of the stators of the path sections. A typical pattern e.g. comprises lengths for the path sections of 100 cm, 50 cm, and 25 cm, i.e. the path sections are available in these three different lengths.

Each path section can be separately fixed to a holder or to a bottom rack and can comprise a left guide and a right guide for the transport movers, wherein the lengths of the guides each correspond to the length of the respective path section.

Consequently, gaps or joints arise between the individual path sections on the assembly of the path, wherein tolerance deviations from the desired dimensions arise in practice that are due to the manufacture or to the installation. Consequently, precision demands must be observed in the assembly so that the transport movers can move, for example slide and/or roll, as uniformly as possible and without resistance on the path sections and beyond directly consecutive path sections.

Known path systems therefore have bridges such as a mentioned, for example, in the following in connection with the invention with reference to FIGS. 9a and 9b.

To in particular further improve the movement of the transport movers in the region of the transitions between directly consecutive path sections and in particular to make it even more free of disturbance, the above-mentioned independent aspect of the invention proposes overlaps.

Transition gaps or transition joints can hereby be implemented that are comparatively small and that have sections offset with respect to one another in the transport direction, whereby a smoother running or a smoother sliding of the transport movers over these transition regions is adopted overall.

In accordance with a further development, the transition region between two consecutive stators and the transition region between directly consecutive guides can be offset from one another in the transport direction.

Provision is made in accordance with a further independent aspect of the invention that the disclosed embodiments can likewise be combined with all the aspects of the invention disclosed herein that the path comprises a plurality of path sections, wherein the guide of the one path section extends beyond the transition region of the stators of the two path sections in at least two directly consecutive path sections.

The guide consequently does not end at the end of the respective stator at at least one side of the stators, preferably both at the left side and at the right side, but rather extends into the directly adjoining path section and ends at generally any desired point on its longitudinal extent. This embodiment is preferably used for comparatively long, straight line sections of the path. Connection pieces such as the above-mentioned bridges (cf. bridges 28 in FIGS. 9a and 9b), that serve for the connection of the consecutive path sections there, can advantageously at least partly be dispensed with, for example for every second stator transition.

The transitions of the stators and the transitions of the guides consequently do not respectively occur at the same point in the transport direction for the transport movers. The guide transitions and the stator transitions rather drift apart in the transport direction; they in particular alternate, whereby a calmer movement of the transport movers along the path results overall.

Provision can be made as a further development of this aspect that transition regions between directly consecutive guides disposed at different sides of the stators are offset from one another in transport direction. In this manner, an even better distribution all of the transitions resulting from the division of the path into individual path sections can be achieved.

Provision is made in accordance with yet a further aspect of the invention that the disclosed embodiments can likewise be combined with all the aspects of the invention disclosed herein that at least the guide of the path comprises a plurality of guide sections, wherein at least one guide section is configured to provide at least one consumable, in particular a detergent, a cleansing agent or a disinfectant, for the transport movers during transport operation.

A section anyway integrated into the path can be used in this manner to provide one or more different consumables required for the transport operation or improving the transport operation.

Provision is made in accordance with an embodiment of this aspect that the guide section includes a consumable store. Alternatively or additionally, the guide section can be connected or connectable to a consumable supply.

Provision can furthermore be made that the guide section is provided at least regionally with dispensing openings and/or is configured as porous for dispensing the consumable.

A guide section in accordance with one of these embodiments can be provided a multiple of times within the path system. The number of such guide sections and their arrangement can take place in dependence on the specific path system. For example, a guide section that is configured for providing a lubricant can be provided prior to known local friction problem points and prior to regions with loaded transport movers, that is with comparatively heavy transport movers.

The guide section configured for providing the consumable can be configured as a module and can have a length adapted to an existing longitudinal pattern of the path system. The guide section can consequently e.g. have a length of 25 cm as part of a path system having path sections of a length of 25 cm, 50 cm and 100 cm.

The guide section can in particular be configured as replaceable when the guide section includes a consumable store.

A lubricant can, for example, be a special plastic or a sintering material.

If the guide section is adapted to be connected to an external consumable store, provision can be made that a resupply of the consumable takes place independently, for example by a slope or by a pressure equalization. In this respect, a control can take place via a resupply valve. Alternatively, an automatically controlled consumable supply is also possible, e.g. by means of a pump or of a metering system.

At least a region of the guide section that serves to dispense the consumable externally can have one or more dispensing openings, e.g. in the form of a passage or of an aperture. Alternatively or additionally, at least a part of the guide section can comprise a porous material which is in particular a sintering material. The porosity of this part of the guide section extends up to its surface so that the consumable is available or can be dispensed at this surface.

Those sides or surfaces of the guide section are preferably configured to dispense the consumable, e.g. a lubricant, externally that are contacted by the transport movers moved along the path in transport operation. Such sides or surface that are not in contact with the transport movers at any time preferably have surfaces that are closed and/or sealed.

The consumable is preferably a fluid that is licensed for use in the food sector.

As already mentioned, the consumable can be a lubricant. The aspect in accordance with the invention explained herein can alternatively or additionally also serve for the provision of a cleansing agent or of a disinfectant.

The present invention also relates to a path section of a path for an apparatus in accordance with the invention, in particular an apparatus in accordance with at least one of the preceding embodiments. This path section can in particular be configured in accordance with the above-explained embodiments.

The invention will be described in the following by way of example with reference to the drawings. There are shown:

FIGS. 9a, 9b and 9c different views of an embodiment of a movement apparatus in accordance with the invention, with FIG. 9a showing a plan view of a plurality of path sections; FIG. 9b showing a side view of a plurality of path sections; and FIG. 9c showing a cross-section of the path;

It must first be noted that the embodiments shown are of a purely exemplary nature. The features of an embodiment can also be combined as desired with features of one or more other embodiments.

Figure 1:
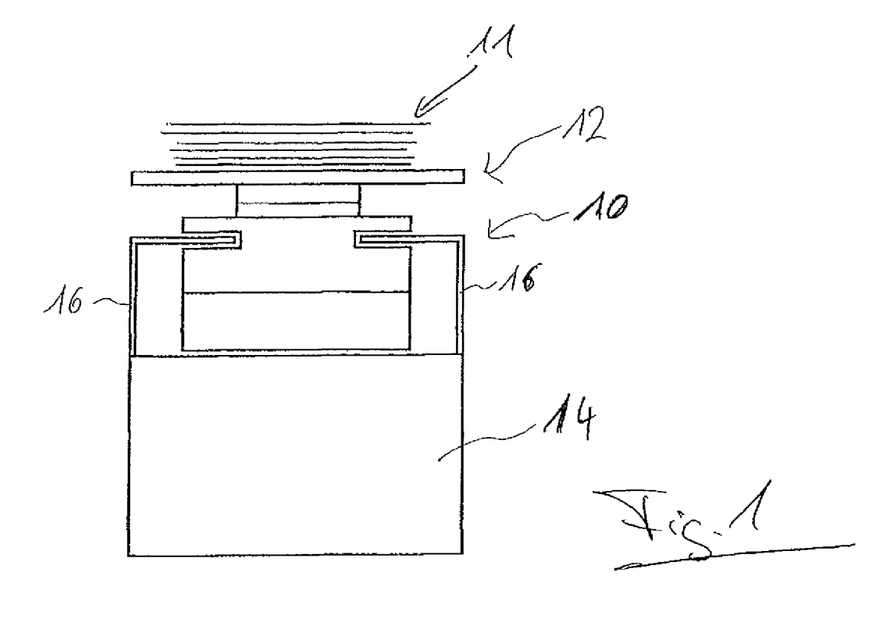
FIG. 1 a sectional view of an embodiment of a movement apparatus in accordance with the invention.

A cross-section of path 10 is shown in FIG. 1 which forms, together with one or more transport movers 12, an apparatus for moving objects 11, for example food portions. The path comprises a stator 14 and two guides 16 associated with the stator 14. The objects 11 lie on the transport mover 12 during transport.

The path 10 is in an operating configuration in FIG. 1 in which the transport movers 12 can move in a guided manner along the path 10.

Figure 2A:
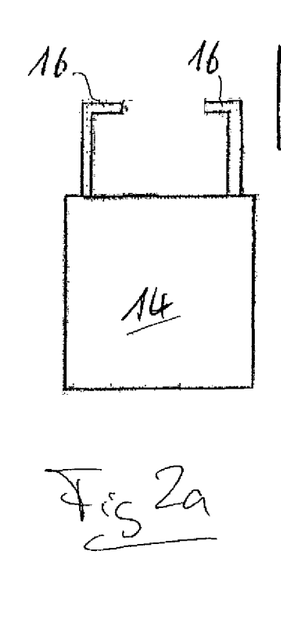
FIGS. 2a and 2b sectional views of an embodiment of a movement apparatus in accordance with the invention; in the operating configuration in FIG. 2a and in the service configuration in FIG. 2b.
Figure 2B:
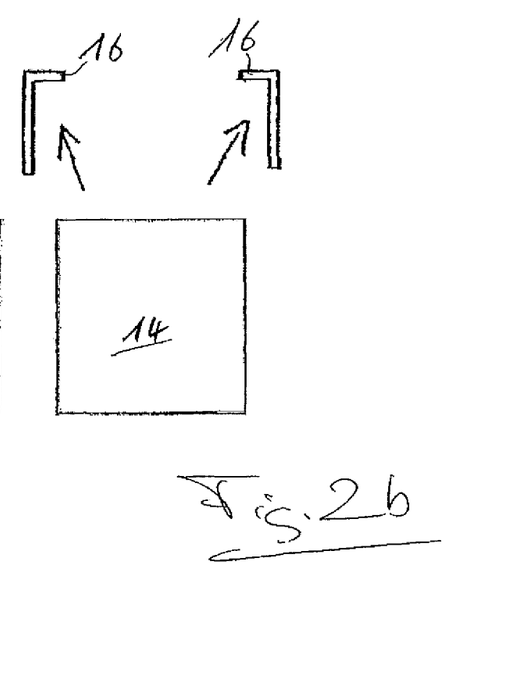
Figure 2C:
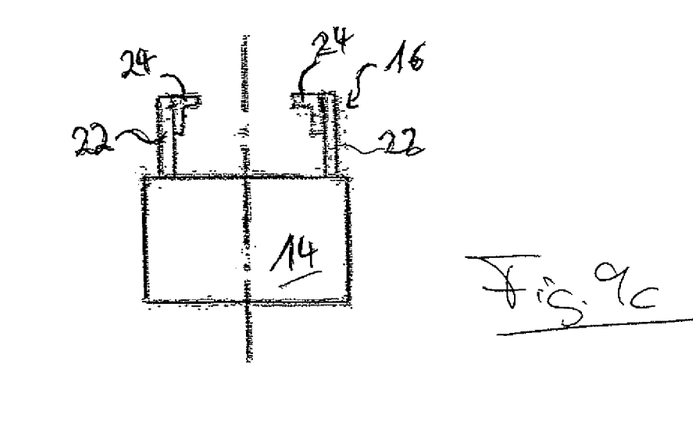

A respective cross-section of a path 10 is shown in FIGS. 2a and 2b, with the guides 16 in FIG. 2a each being in their working position, whereas in FIG. 2b, the guides 16 have each been moved out of the working position in that they have simply been removed from the stator 14.

Figures 3A, 3B:
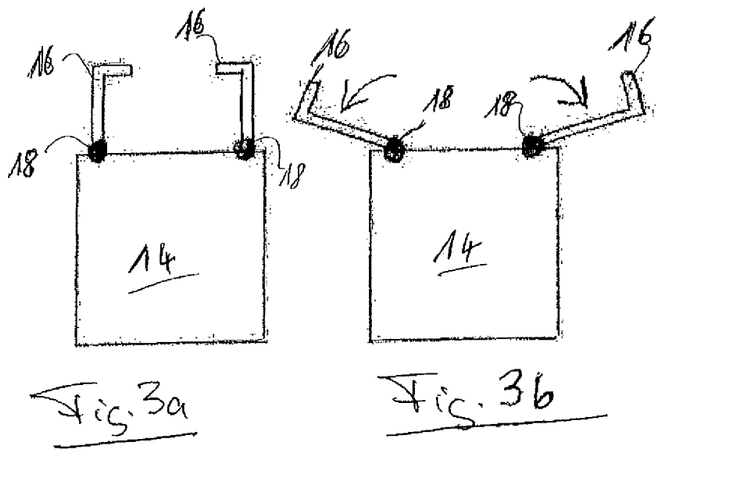
FIGS. 3a and 3b sectional views of an embodiment of a movement apparatus in accordance with the invention; in the operating configuration in FIG. 3a and in the service configuration in FIG. 3b.

A respective cross-section of a path 10 is shown in FIGS. 3a and 3b, with the guides 16 each being connected to the stator 14 by an articulated connection 18. The guides 16 are in their working positions in FIG. 3a, whereas in FIG. 3b the guides 16 have each been moved out of the working positions by a pivoting movement. The guides 16 can therefore remain at the path 10 in this service configuration.

Figures 4A, 4B:
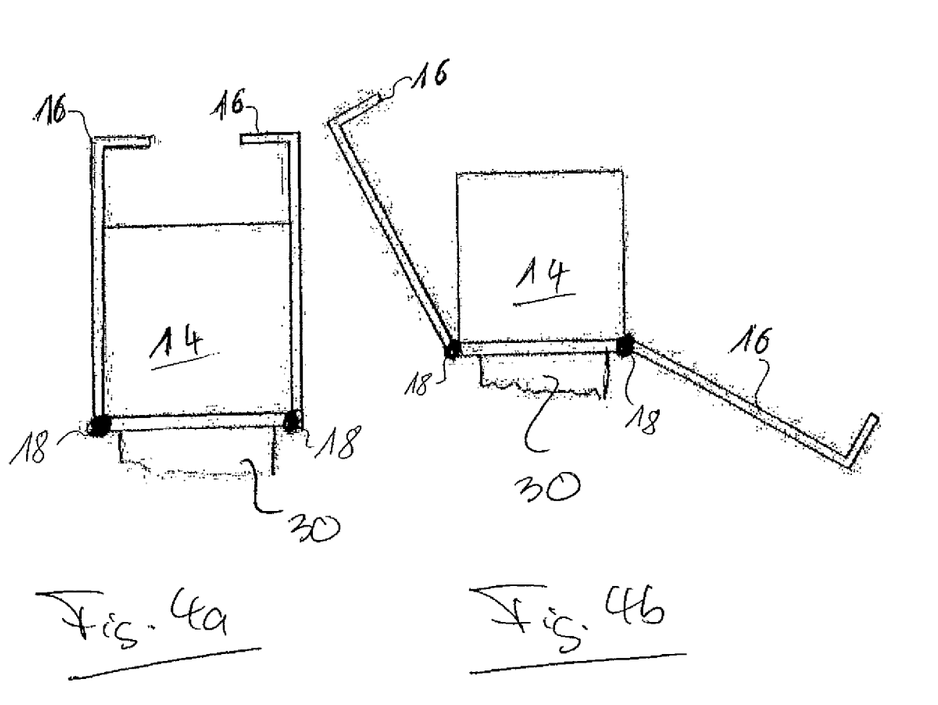
FIGS. 4a and 4b sectional views of an embodiment of a movement apparatus in accordance with the invention; in the operating configuration in FIG. 4a and in the service configuration in FIG. 4b.

While in accordance with FIGS. 3a and 3b the articulated connections 18 are arranged in an upper region of the stator 14, in accordance with FIGS. 4a and 4b an articulated connection of the guides 16 to the stator 14 takes place in a lower region, and indeed in the region of a transition between the stator 14 and a rack 30 not shown in any more detail. The path 10 is consequently e.g. even more accessible for cleaning in the service configuration in accordance with FIG. 4b.

Figure 5A:
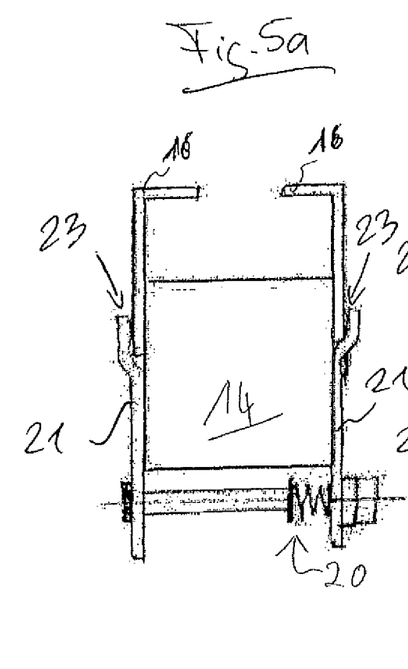
FIGS. 5a and 5b sectional views of an embodiment of a movement apparatus in accordance with the invention; in the operating configuration in FIG. 5a and in the service configuration in FIG. 5b.
Figure 5B:
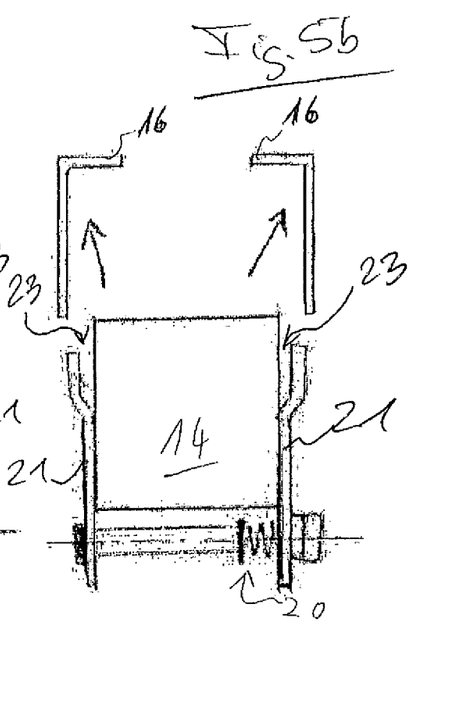

In FIGS. 5a and 5b, the guides 16 are each connected to the stator 14 by means of a clamping device 20. Clamping elements 21 of the clamping device 20 form mounts 23—of pocket form in this example—for the guides 16 in which the guides 16 are each securely fixed in the working position in accordance with FIG. 5a. In FIG. 5b, the clamping device 20 is in a release position in which the guides 16 can be simply removed from the mounts 23.

Figure 6A:
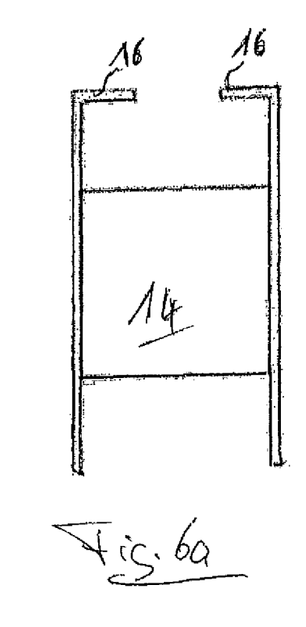
FIGS. 6a and 6b sectional views of an embodiment of a movement apparatus in accordance with the invention; in the operating configuration in FIG. 6a and in the service configuration in FIG. 6b.
Figure 6B:
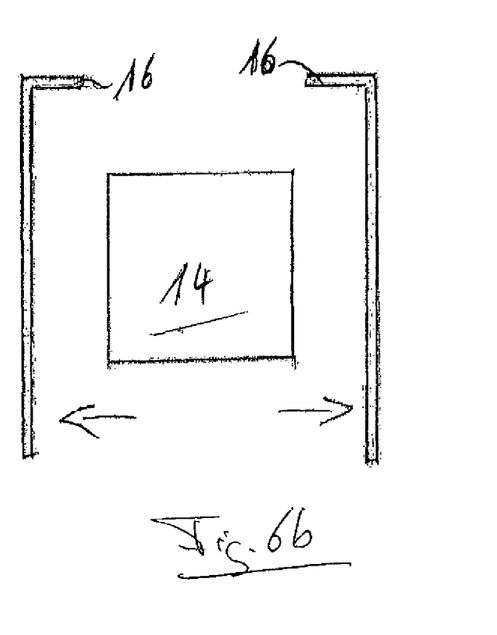

In the embodiment of FIGS. 6a and 6b, the fixing of the guides 16 to the stator 14 takes place by magnetic force. The guides 16 or the stator 14 can be provided with permanent magnets for this purpose. The guides 16 and the stator 14 are furthermore provided with positioning or alignment aids, not shown, that fix a defined relative position between the guide 16 and the stator 14 respectively such that an exact guide of the transport movers, not shown here, is ensured. The guides 16 can consequently be removed fast and simply here, namely without tools, (FIG. 6b) and can again be brought back into their working position at the stator 14 (FIG. 6a).

Figures 7A, 7B:
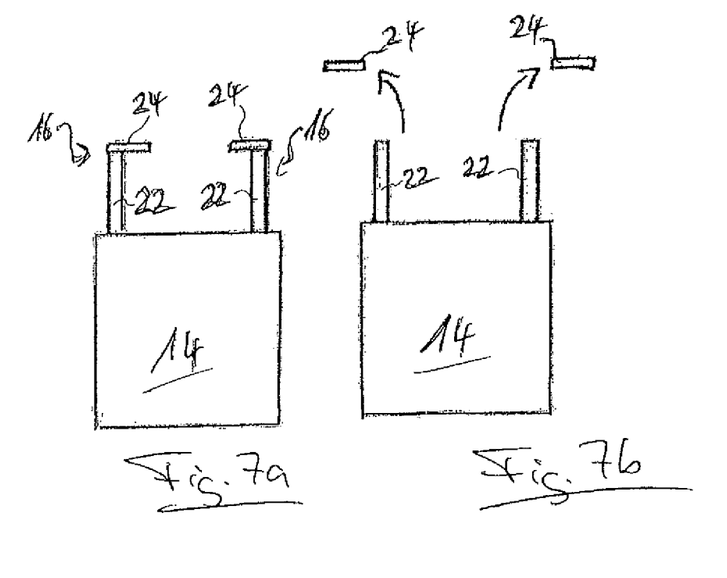
FIGS. 7a and 7b sectional views of an embodiment of a movement apparatus in accordance with the invention; in the operating configuration in FIG. 7a and in the service configuration in FIG. 7b.

In FIGS. 7a and 7b, the guides 16 each comprise a guide element 18 and a carrier 22 that is fixedly connected to the stator 14 and that carries the guide element 18. The guide element 18 can be moved out of its working position in accordance with FIG. 7a by removal from the carrier 22 remaining at the stator 14. This embodiment shows that the respective components, here the guides 16, do not each have to be removed as a whole, i.e. that it is sufficient only to remove a respective part of the guides 16 to switch the path into the service configuration.

Figure 8A:
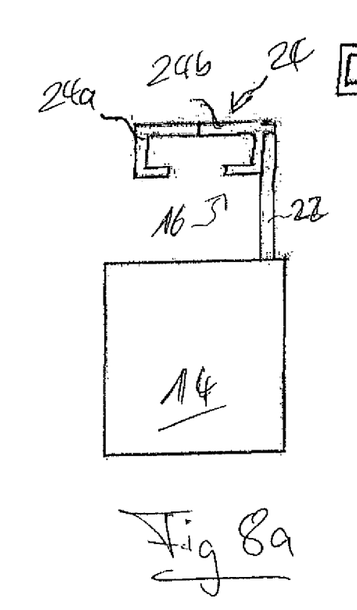
FIGS. 8a and 8b sectional views of an embodiment of a movement apparatus in accordance with the invention; in the operating configuration in FIG. 8a and in the service configuration in FIG. 8b.
Figure 8B:
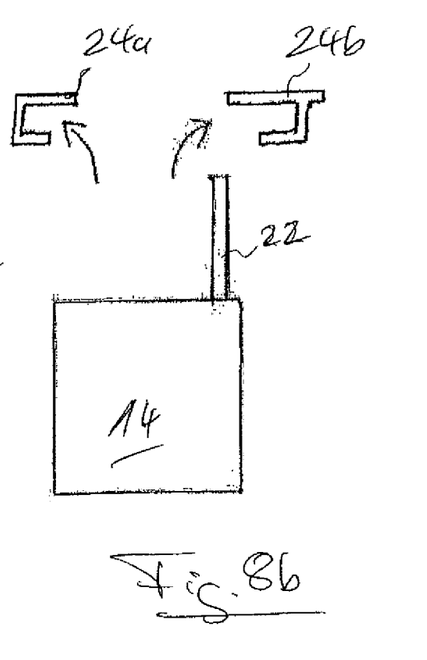

In FIGS. 8a and 8b, the guide 16 only comprises one single carrier 22 that is fixedly connected to the stator 14 at one of the longitudinal sides and that carries a multi-part guide element 24. This variant has the advantage that a component, here the carrier 22, only remains at one side in the service configuration of the path.

Figure 9A:
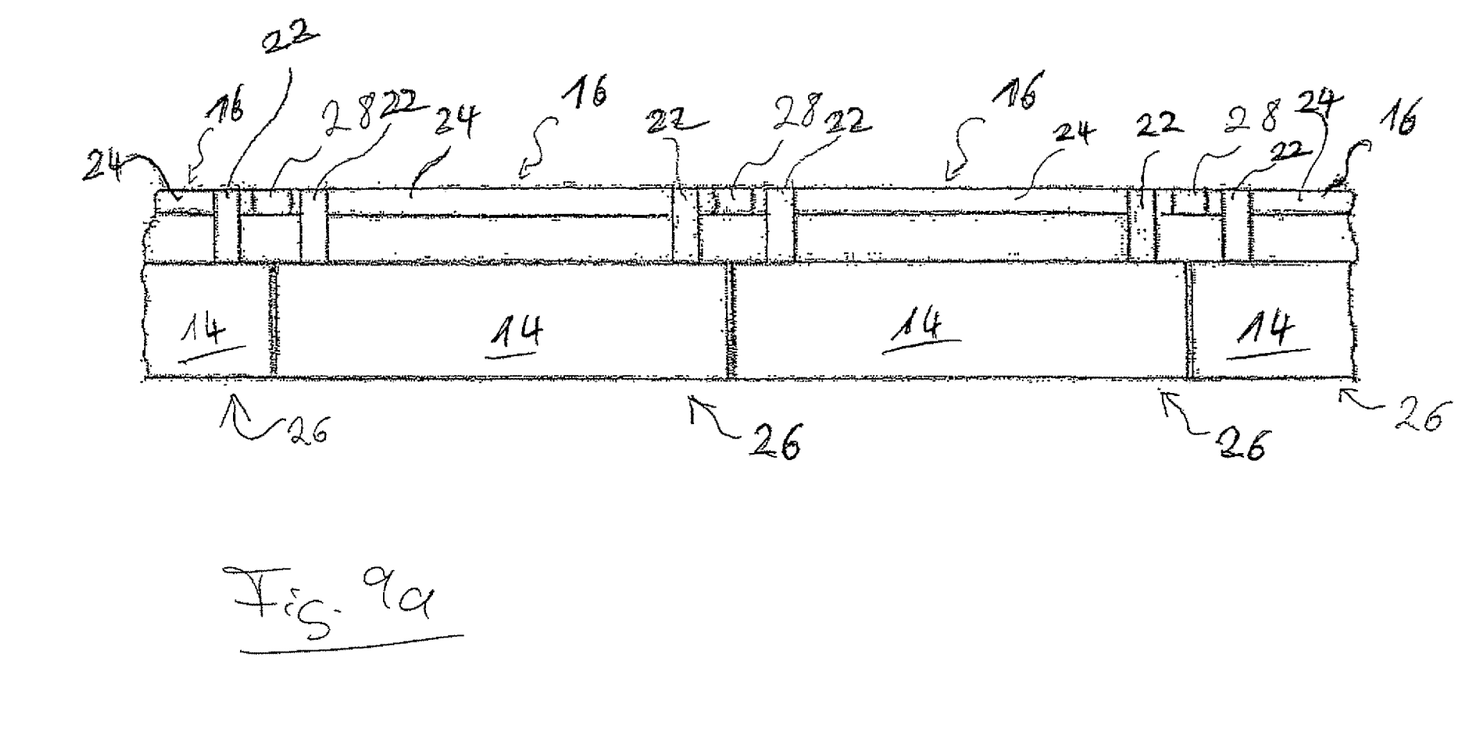

In accordance with FIGS. 9a and 9b, a plurality of consecutive path sections 26, that each comprise a stator 14 and a guide 16, are connected to form a path 10. Each guide 16 comprises carriers 22 and a rail-like guide element 24. FIG. 9c shows a corresponding cross-sectional view.

To ensure an alignment of the guide rails 24 at the transitions between the path sections 26, consecutive guide rails 24 are connected to one another by bridge elements 28 that align the guide rails 24 relative to one another. These bridges 28 inter alia prevent the transport movers from being impeded by non-aligned guide rails 24 on the transition from one path section 26 into the next path section 26.

A plurality of consecutive guide rails 24 can remain connected to one another by the bridge elements 28 when the guide rails 24 are removed from the path 10 to transition them into a service configuration. At those points at which the connection between consecutive guide rails 24 is to be released, a respective mechanism can be provided that enables a simultaneous release of the respective bridge 28 and a release of the connections between the guide rails 24 and the stator 14.

Figure 10:
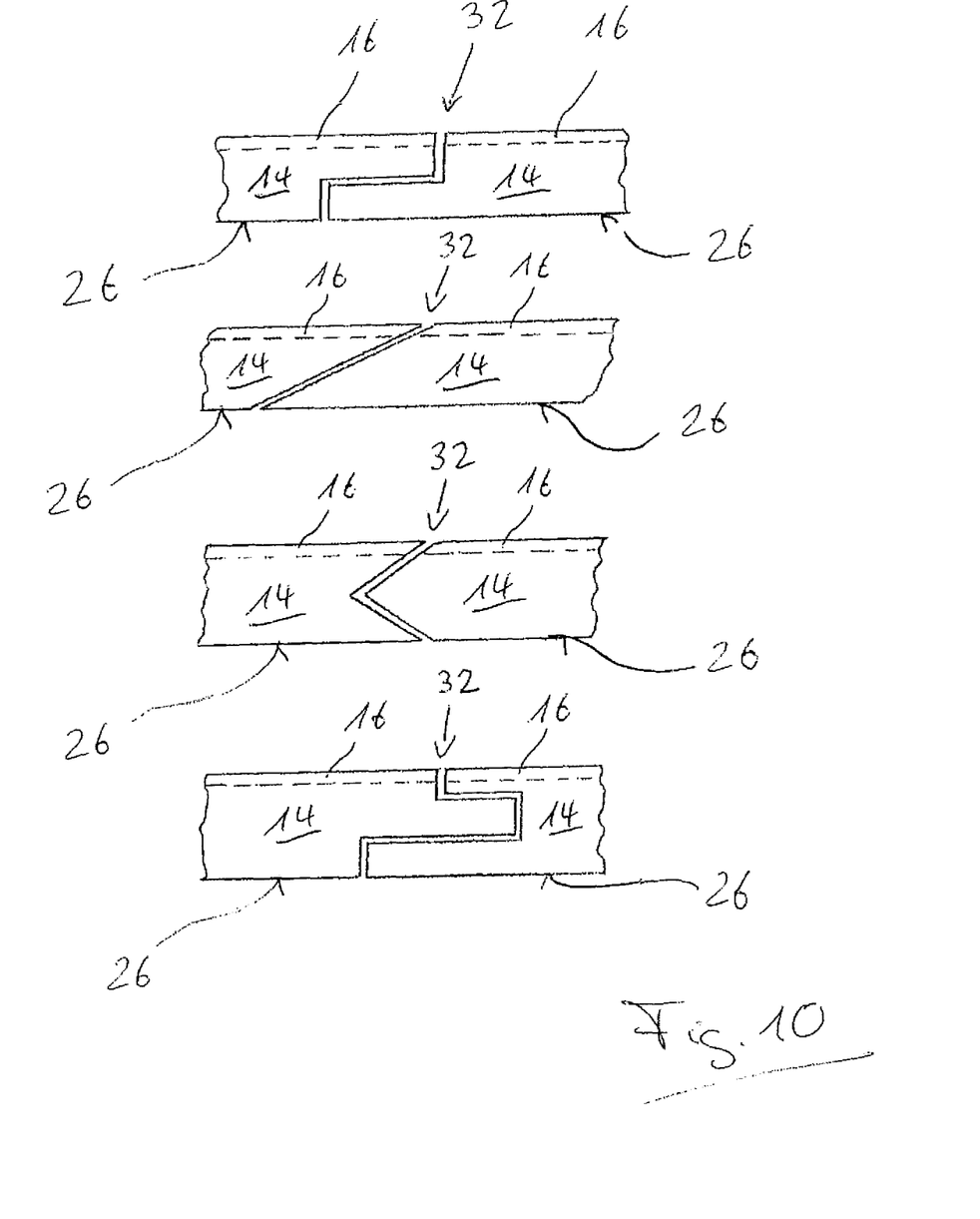
FIG. 10 further embodiments of a movement apparatus in accordance with the invention.

Four possible embodiments how transition regions between directly consecutive path sections can be designed in a path system of an apparatus in accordance with the invention are shown in FIG. 10.

Each path section 26 comprises a stator 14 and a guide 16. With a design of the guides 16 or of transitions between directly consecutive sections of the guides 16 possibly provided in the region of the transition 32 or also at another point, provision is respectively made in these embodiments that the directly consecutive stators 14 overlap, and indeed such that the stators 14 engage into one another in an at least substantially shape-matched manner in the manner of a complementary toothed arrangement. The extent of the transition is generally as desired. FIG. 10 shows four different possibilities purely by way of example.

In accordance with a possible embodiment, the four representations of FIG. 10 show a plan view of the transition region 32, i.e. the two stators 14 overlap one another at the side.

In an alternative embodiment, the directly consecutive stators 14 can also overlap in the vertical direction. Such embodiments are shown in FIG. 10 when the individual representations are considered as a side view.

FIG. 10 thus discloses two alternative embodiments of the invention—lateral overlap and vertical overlap—each with four possible variants.

In general, geometrically more complex overlaps or toothed arrangements are also conceivable that have both a lateral component and a vertical component.

A lateral overlap, that is an observation of the representations in FIG. 10 as a plan view in each case, is preferred.

Figure 11:
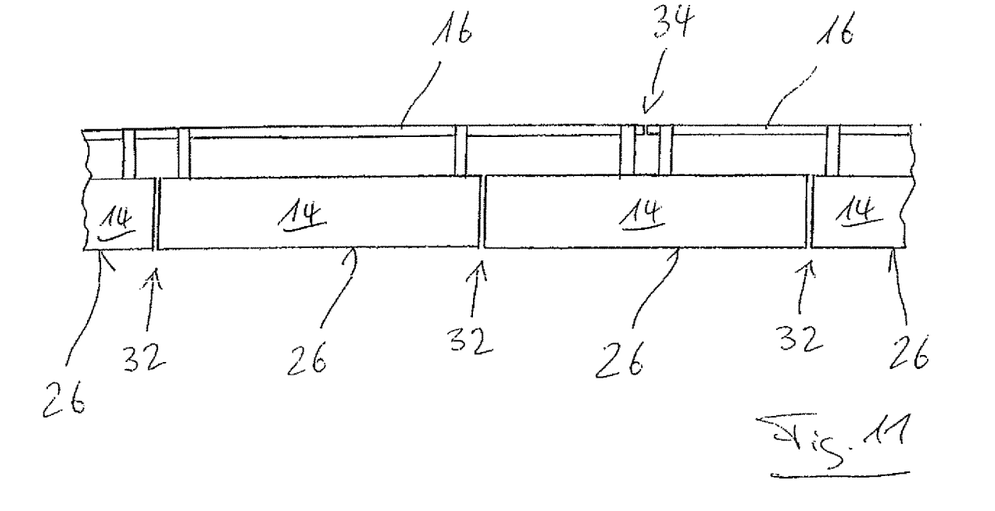
FIGS. 11 and 12 a further embodiment in each case of a movement apparatus in accordance with the invention.
Figure 12:
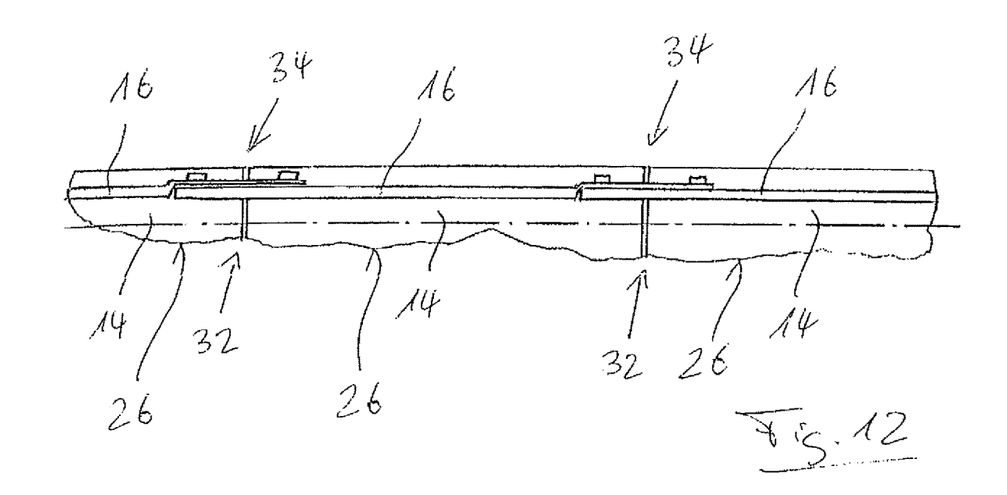

FIGS. 11 and 12 each show possible transitions 34 between directly consecutive guide sections 16 of the path sections 26. The design of these transition regions 34 is generally independent of the design of the transition regions 32 between directly consecutive stators.

In the embodiment of FIG. 11 that shows a side view of a plurality of directly consecutive path sections 26, the guide transitions 34 of the side of the guide 16 shown are offset in the transport direction with respect to the transitions 32 between the stators 14. This is achieved in that the guide 16 extends beyond the stator transition 32, but ends before the next transition 32 and forms, together with a guide section extending in the opposite direction beyond the last-named transition 32, a guide transition 34 that is disposed within the longitudinal extent of a stator section 14.

FIG. 12 shows an embodiment in which consecutive guide sections overlap laterally in the transition region 34. The guides 16 can be fixed to a carrier, for example, in the overlap region.

Analogously to the embodiment of FIG. 11, the transitions regions 24 between the guides 16 can also be offset in the transport direction with respect to the transition regions 32 between the stators 14 in the embodiment in accordance with FIG. 12.

In FIG. 12, an overlap without teeth is shown, i.e. the mutually overlapping regions of the guides 16 are—unlike with the stator overlaps in accordance with FIG. 10—not configured in the sense of a complementary shape matching. Such an overlap with teeth having a complementary shape matching for an uninterrupted continuation of the cross-section of the guides is—as with the stator transitions of FIG. 10—alternatively, however, also possible for the guide transitions 34 in accordance with FIG. 12.

REFERENCE NUMERAL LIST

10 path
11 object
12 transport mover
14 stator
16 guide
18 articulated connection
20 clamping device
21 clamping element
22 carrier
23 mount
24 guide element
24a part of the guide element
24b part of the guide element
26 path section
28 bridge
30 rack
32 transition region of the stators
34 transition region of the guides

The invention claimed is:

1. An apparatus for moving objects, the apparatus comprising
   a plurality of individually movable transport movers for the transport of the objects;
   a path system for the transport movers in which the transport movers are movable along at least one predefined path; and
   a control device for controlling the movements of the transport movers in the path system,
   wherein the path comprises a stator and an associated guide for the transport movers, and wherein the path can be transitioned at least sectionally from an operating configuration into a service configuration in which at least one component of the path is moved relative to the stator out of its working position corresponding to a transport operation, the component being at least a portion of the guide, the transport operation comprising the at least one component being in its working position during operation of the apparatus in which the objects are transported along the path system.

2. The apparatus in accordance with claim 1, wherein the component is connected both in its working position corresponding to the operating configuration of the path and in a servicing position corresponding to the service configuration of the path and the component is adjustable between the working position and the servicing position.

3. The apparatus in accordance with claim 2, wherein the component is adjustable between the working position and the servicing position by an adjustment movement that comprises at least a pure pivoting movement or a linear movement and/or that comprises a combined release and adjustment movement.

4. The apparatus in accordance with claim 1, wherein the component is fixed to the path in the working position without any additional mechanical connection means needed to fix the component to the path in the working position.

5. The apparatus in accordance with claim 4, wherein the component is fixed to a mount associated with the path in the working position.

6. The apparatus in accordance with claim 1, wherein a fixation of the component effective in the working position is releasable without tools.

7. The apparatus in accordance with claim 1, wherein the component is fixed in the working position by one of magnetic forces, a latching connection, a plug-in connection, a clamping connection, a snap-in connection, and an articulated connection.

8. The apparatus in accordance with claim 7, wherein the fixing of the component is at least also effected by a weight of the component.

9. The apparatus in accordance with claim 1, wherein a further control device or said control device is configured for a condition monitoring of at least one path section, with the further control device or said control device being able to distinguish between the operating configuration and the service configuration.

10. The apparatus in accordance with claim 1, wherein the path is subdivided in at least one part region into a plurality of path sections releasably connected to one another, with the guides of directly consecutive path sections each being connected to one another by at least one bridge, and with the at least one bridge being releasable without tools.

11. The apparatus in accordance with claim 1, wherein the path is subdivided in at least one part region into a plurality of path sections that are releasably connected to one another and that each have at least one stator and one guide, with the guides of at least some path sections being able to be moved out of the working position together.

12. The apparatus in accordance with claim 1, wherein the path is subdivided in at least one part region into a plurality of path sections that are releasably connected to one another and that each have at least one stator and one guide, with the guides of at least some path sections being able to be moved out of the working position independently of one another.

\* \* \* \* \*